(12) United States Patent
Lee et al.

(10) Patent No.: US 9,386,579 B2
(45) Date of Patent: Jul. 5, 2016

(54) METHOD AND APPARATUS OF CONTROLLING CELL ACTIVATION IN A WIRELESS COMMUNICATION SYSTEM

(71) Applicant: LG ELECTRONICS INC., Seoul (KR)

(72) Inventors: Sunyoung Lee, Anyang-si (KR);
Youngdae Lee, Anyang-si (KR);
Sungjun Park, Anyang-si (KR);
Seungjune Yi, Anyang-si (KR);
Sunghoon Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 14/383,007

(22) PCT Filed: Apr. 4, 2013

(86) PCT No.: PCT/KR2013/002803
§ 371 (c)(1),
(2) Date: Sep. 4, 2014

(87) PCT Pub. No.: WO2013/151348
PCT Pub. Date: Oct. 10, 2013

(65) Prior Publication Data
US 2015/0049739 A1    Feb. 19, 2015

Related U.S. Application Data

(60) Provisional application No. 61/619,944, filed on Apr. 4, 2012.

(51) Int. Cl.
*H04W 72/04*    (2009.01)
*H04W 56/00*    (2009.01)

(52) U.S. Cl.
CPC ....... *H04W 72/0446* (2013.01); *H04W 56/0045* (2013.01); *H04W 72/042* (2013.01)

(58) Field of Classification Search
CPC ................... H04W 72/0446; H04W 56/0045; H04W 72/042
See application file for complete search history.

(56) References Cited

U.S. PATENT DOCUMENTS

| | | | | |
|---|---|---|---|---|
| 2013/0188473 A1* | 7/2013 | Dinan | ............... | H04W 56/0005 370/216 |
| 2013/0188619 A1* | 7/2013 | Dinan | ............... | H04W 56/0005 370/336 |
| 2013/0258958 A1* | 10/2013 | Dinan | ............... | H04W 56/0045 370/329 |
| 2013/0260735 A1* | 10/2013 | Dinan | ............... | H04W 56/0005 455/418 |

OTHER PUBLICATIONS

Asustek, "Handeling of deactivation timer for multiple TA", 3GPP TSG-RAN WG2 Meeting #77, Agenda Item: 7.1.2.4, Dresden, Germany, Feb. 6-10, 2012, 3 pages, R2-120154.

(Continued)

*Primary Examiner* — Ajay Cattungal
(74) *Attorney, Agent, or Firm* — Birch, Stewart, Kolasch & Birch, LLP

(57) ABSTRACT

The present invention is directed to a method and an apparatus used for in a wireless communication system. Specifically, the present invention is directed to a method of controlling cell activity and an apparatus therefore, in which the method comprises: receiving a signal including an identifier and a timer value, wherein the identifier identifies a corresponding TAG and the timer value is used for cell deactivation of the corresponding TAG; and applying the received timer value to all cells belonging to the corresponding TAG.

10 Claims, 15 Drawing Sheets

(56) References Cited

OTHER PUBLICATIONS

Ericsson, "Introduction of CA Enhancements in MAC", 3GPP TSG-RAN WG2 Meeting #77bis, Jeju, Korea, Mar. 25-30, 2012, 13 pages, R2-121961.

ITRI, "Deactivation of Timing Reference SCell in sTAG", 3GPP TSG-RAN WG2 Meeting #77bis, Agenda Item: 7.1.2.2, Jeju, Korea, Mar. 28-30, 2012, 3 pages, Tdoc R2-121530.

LG Electronics INC."Handling of the Timing Reference SCell Deactivation", 3GPP TSG-RAN WG2 Meeting #77bis. Agenda Item: 7.1.2.2 Jeju, South Korea, Mar. 26-30, 2012, 2 pages, R2-121366.

Potevio, "Considerations on deactivation timer handling for RA SCell", 3GPP TSG-RAN WG2 Meeting #77bis. Agenda Item: 7.1.2.4, Jeju, Korea, Mar. 28-30, 2012, 2 pages, R2-121715.

* cited by examiner

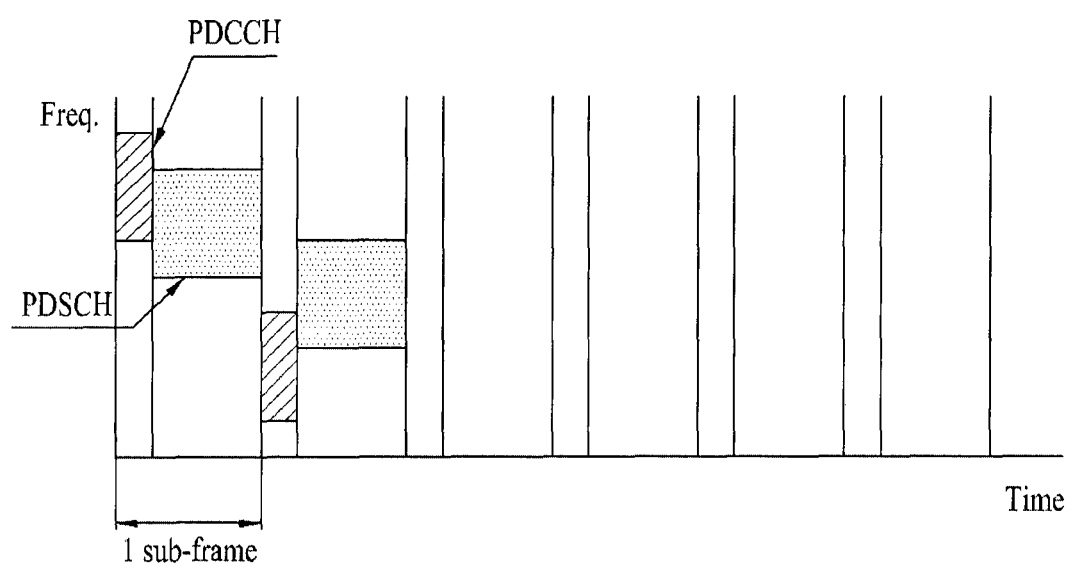

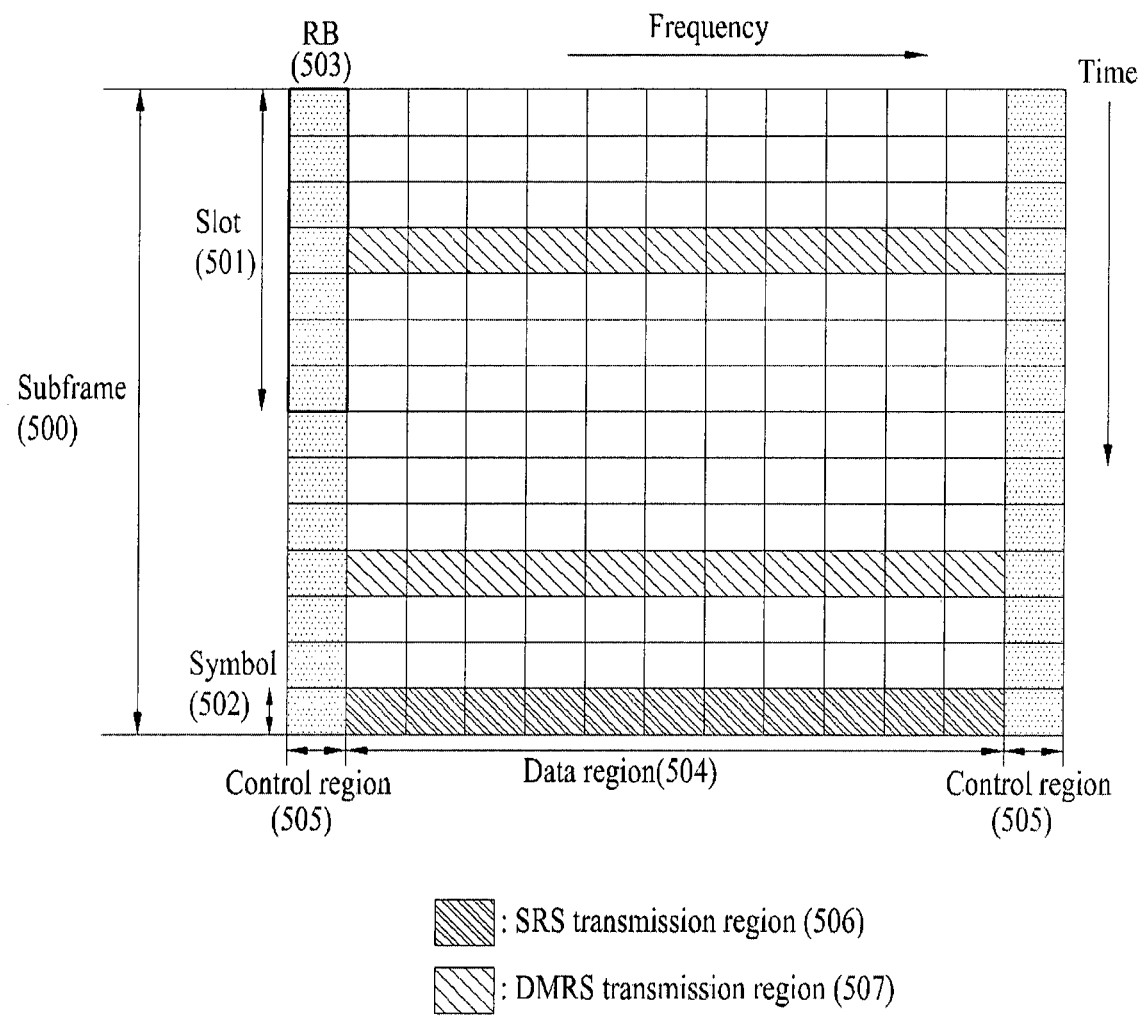

METHOD AND APPARATUS OF CONTROLLING CELL ACTIVATION IN A WIRELESS COMMUNICATION SYSTEM

This application is the National Phase of PCT/KR2013/002803 filed on Apr. 4, 2013, which claims priority under 35 U.S.C. 119(e) to U.S. Provisional Application No. 61/619,944 filed on Apr. 4, 2012, all of which are hereby expressly incorporated by reference into the present application.

TECHNICAL FIELD

The present invention is directed to a method and an apparatus used for in a wireless communication system. Specifically, the present invention is directed to a method and an apparatus of controlling cell activation in a wireless communication system supporting Carrier Aggregation (CA).

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, etc.

DISCLOSURE

Technical Problem

An object of the present invention is to provide a method and an apparatus of efficiently controlling cell activation in a wireless communication system.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As a first aspect of the invention, a method of controlling cell activity at a user equipment in a wireless communication system is provided. The method comprises: receiving a signal including an identifier and a timer value, wherein the identifier identifies a corresponding Timing Advance Group (TAG) and the timer value is used for cell deactivation of the corresponding TAG; and applying the received timer value to all cells belonging to the corresponding TAG.

As a second aspect of the invention, a User Equipment (UE) configured to control cell activity in a wireless communication system is provided. The UE comprises: a radio frequency (RF) module; and a processor, wherein the processor is configured to: receive a signal including an identifier and a timer value, wherein the identifier identifies a corresponding Timing Advance Group (TAG) and the timer value is used for cell deactivation of the corresponding TAG, and apply the received timer value to all cells belonging to the corresponding TAG.

Preferably, the identifier may be a TAG identifier.

Preferably, the identifier may be a cell identifier, and the timer value is applied to all cells belonging to the corresponding TAG including a cell indicated by the cell identifier.

Preferably, the cell identifier may be a secondary cell identifier.

Preferably, the signal may be a Radio Resource Control (RRC) signal or a Medium Access Control (MAC) signal.

Preferably, the corresponding TAG may be a secondary TAG.

Preferably, a timer value of a first TAG may be set to be different from a timer value of a second TAG.

Advantageous Effects

Exemplary embodiments of the present invention have the following effects. In accordance with the embodiments of the present invention, cell activation can be efficiently controlled in a wireless communication system.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 4 illustrates a downlink subframe and physical channels.

FIG. 5 illustrates a structure of an uplink subframe.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
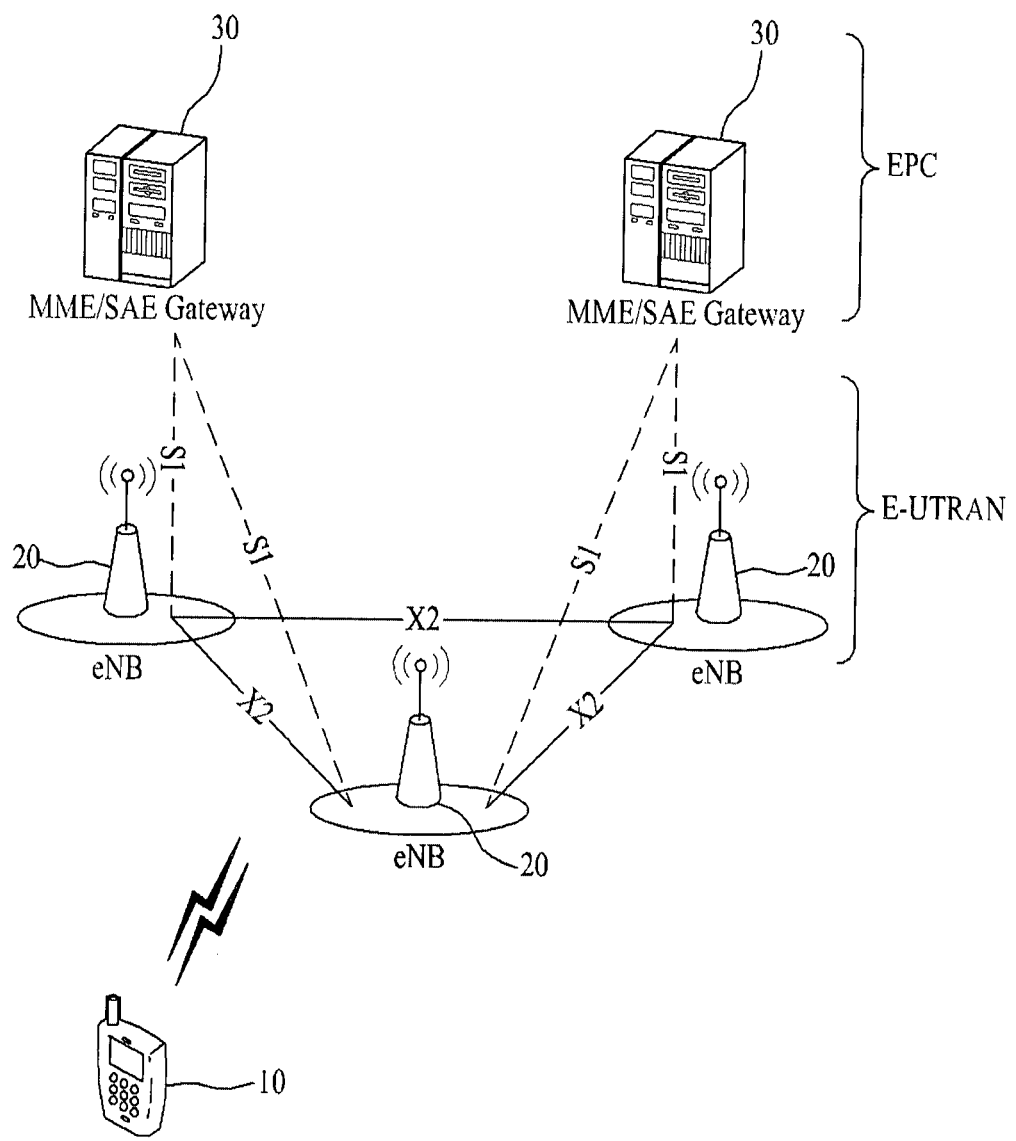
FIG. 1 illustrates a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

With reference to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a Radio Frequency (RF) unit and a processor, among other components, and is configured to operate in accordance with the various techniques presented herein.

The eNB 20 is generally a fixed station that communicates with the UE 10. In addition to being referred to as a base station or an access point. An eNB 20 provides end points of a user plane and a control plane to the UE 10. In general, the eNB includes a Radio Frequency (RF) unit and a processor, among other components, and is configured to operate in accordance with the various techniques presented herein.

In terms of geometric view, a plurality of UEs 10 may be located in one cell in. One eNB 20 is typically deployed per cell. An interface for transmitting user traffic or control traffic may be used between eNBs 20. Here, "downLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
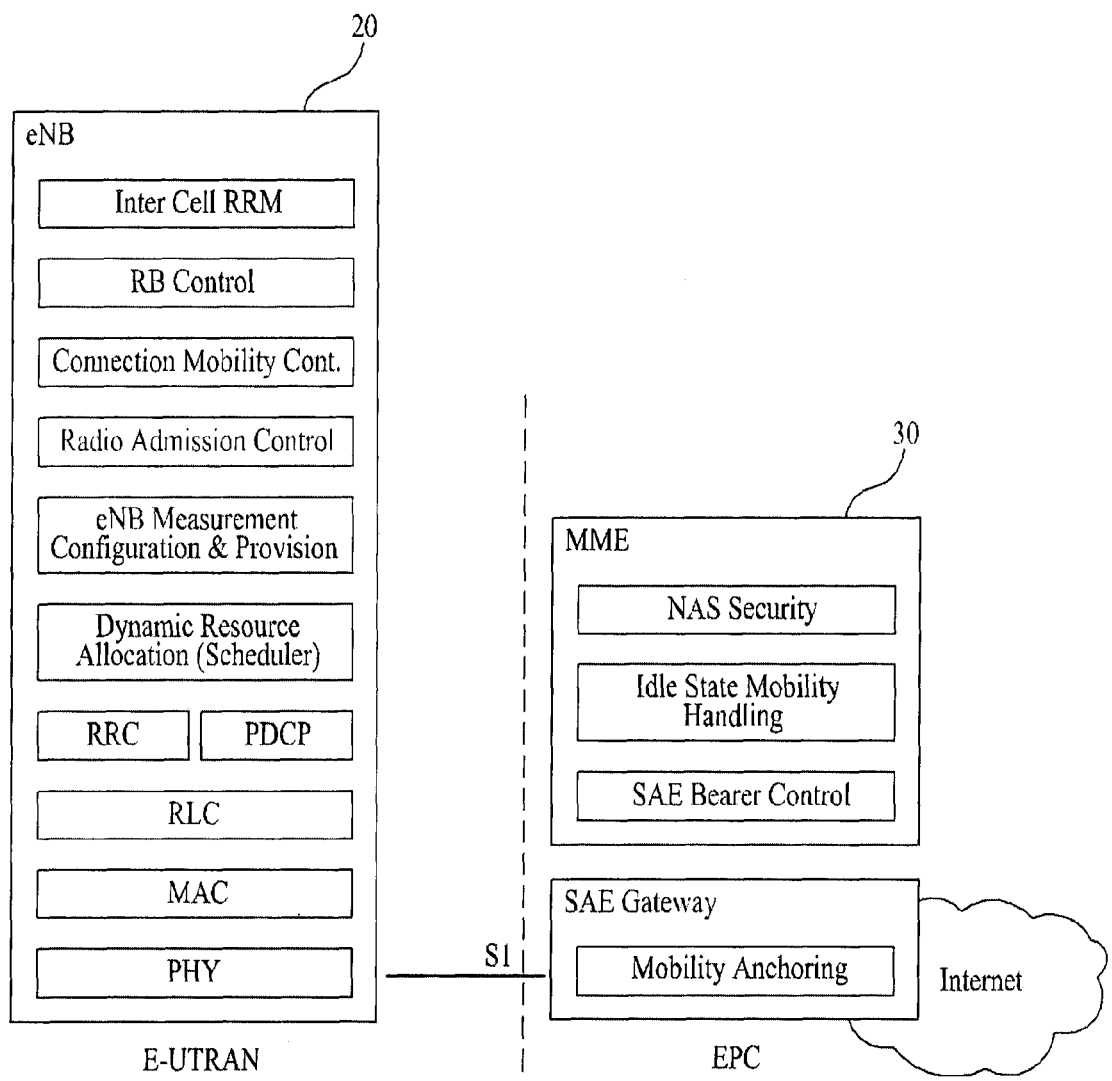
FIG. 2 illustrates a general structure of a typical E-UTRAN and that of a typical Evolved Packet Core (EPC).

FIG. 2 is a block diagram depicting general structures of an E-UTRAN and a EPC. With reference to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
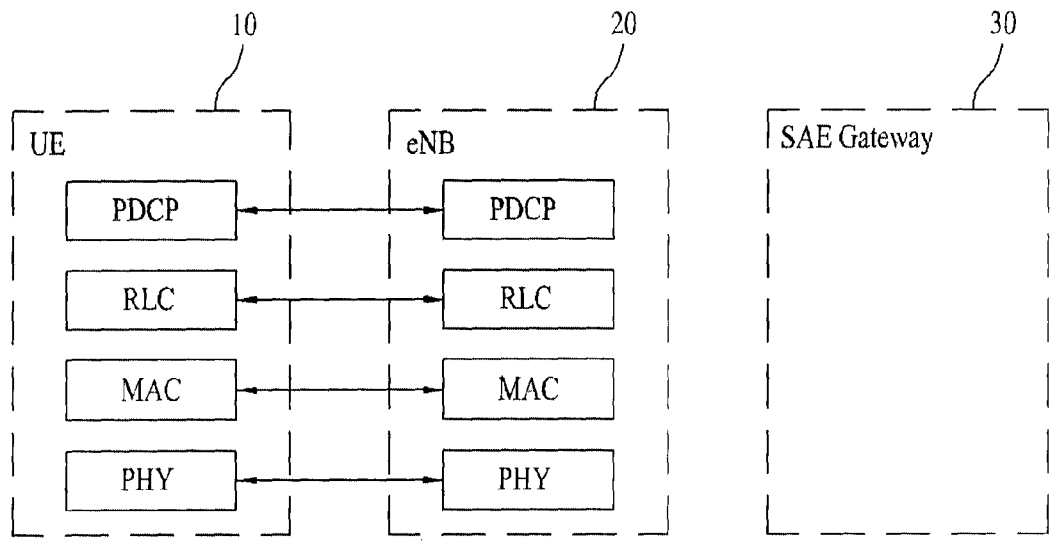
FIGS. 3a~3b illustrate a user-plane protocol and a control-plane protocol stack for the E-UMTS network
Figure 3B:
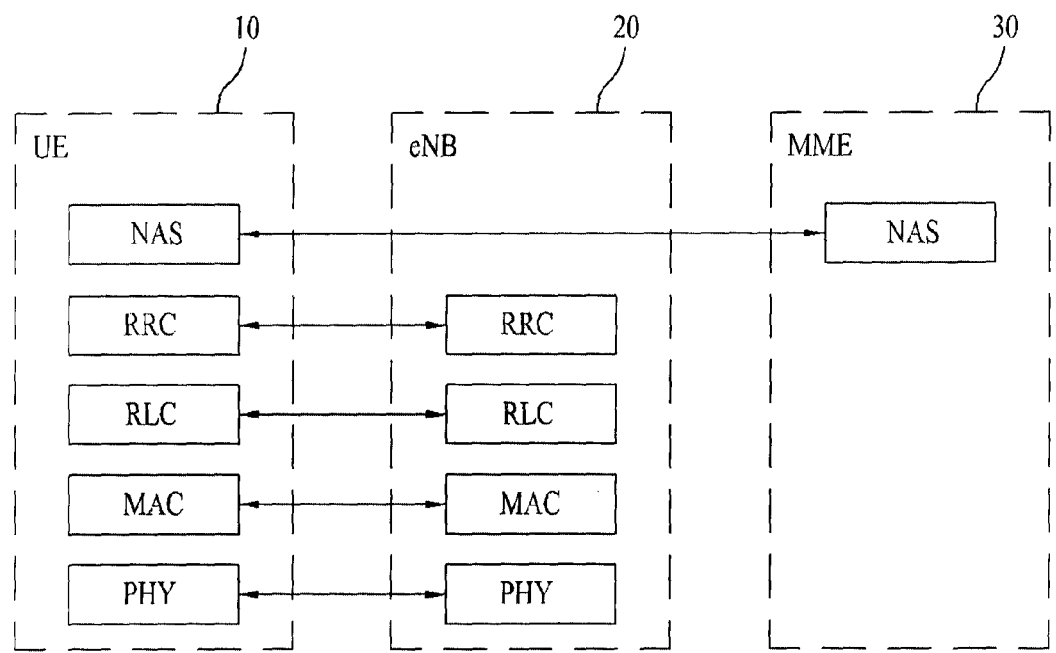

FIGS. 3a~3b illustrate the user-plane protocol and the control-plane protocol stack for the E-UMTS network. With reference to FIGS. 3a~3b, the protocol layers may be divided into a first layer (L1), a second layer (L2) and a third layer (L3) based upon the three lower layers of an Open System Interconnection (OSI) standard model.

The first layer L1 (or physical layer, PHY) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3a~3b as being separate from the MAC layer, it is understood that the functions of the RLC layer may be performed by the MAC layer and that, therefore, a separate RLC layer may not be required. With reference to FIG. 3a, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

With reference to FIG. 3b, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

With reference to FIG. 3a, the RLC and MAC layers (terminated in an eNB 20 on the network side) may perform functions such as scheduling, Automatic Repeat reQuest (ARQ), and Hybrid ARQ (HARQ). The PDCP layer (terminated in eNB 20 on the network side) may perform functions such as header compression, integrity protection, and ciphering.

With reference to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: a LTE_DETACHED state if there is no RRC entity; a LTE_IDLE state if there is no RRC connection while storing minimal UE information; and an LTE_ACTIVE state if the RRC connection is established.

Thus RRC state may be divided into two different states such as an RRC_IDLE state and an RRC_CONNECTED state.

In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution—Temporary Mobile Subscriber Identity (S-TMSI)) which uniquely identifies the UE in a tracking area. In the RRC-IDLE state, no RRC context is stored in the eNB. In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB. In RRC_CONNECTED state, the E-UTRAN knows the cell to which the UE 10 belongs. Therefore, the network can transmit and/or receive data to/from UE 10, the network can control mobility (handover) of the UE.

FIG. 4 illustrates a downlink subframe and physical channels.

With reference to FIG. 4, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted via a PDCCH is referred to as Downlink Control Information (DCI). DCI includes resource allocation information for either an UE or an UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted via a Paging Channel (PCH), system information transmitted via the DL-SCH, resource allocation information of an upper-layer control message such as a random access response transmitted via the PDSCH, a set of Tx power control commands of each UE contained in an UE group, a Tx power control command, activation indication information of Voice over IP (VoIP), and the like. A plurality of PDCCHs may be transmitted within a control region. An UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

FIG. 5 is illustrates the structure of an uplink subframe.

With reference to FIG. 5, 1 ms subframe 500, which is a basic unit of uplink transmission of LTE/LTE-A, includes two 0.5 ms slots 501. Assuming that a normal Cyclic Prefix (CP) is configured, a slot includes 7 symbols 502 and one symbol corresponds to one SC-FDMA symbol. A resource block 503 is a resource allocation unit which corresponds to 12 subcarriers in the frequency domain and corresponds to one slot in the time domain. A structure of an uplink subframe is mainly divided into a data area 504 and a control area 505. The data area is a series of communication resources that are used to transmit data such as audio or a packet to each UE and corresponds resources other than the control area in the subframe. The control area is a series of communication resources that are used to transmit a report for downlink channel quality, an ACK/NACK to a downlink signal, an uplink scheduling request, or the like from each UE. A Sounding Reference Signal (SRS) is transmitted in the last SC-FDMA symbol of the subframe in a time domain and is transmitted through a data transmission band in a frequency domain.

Figure 6:
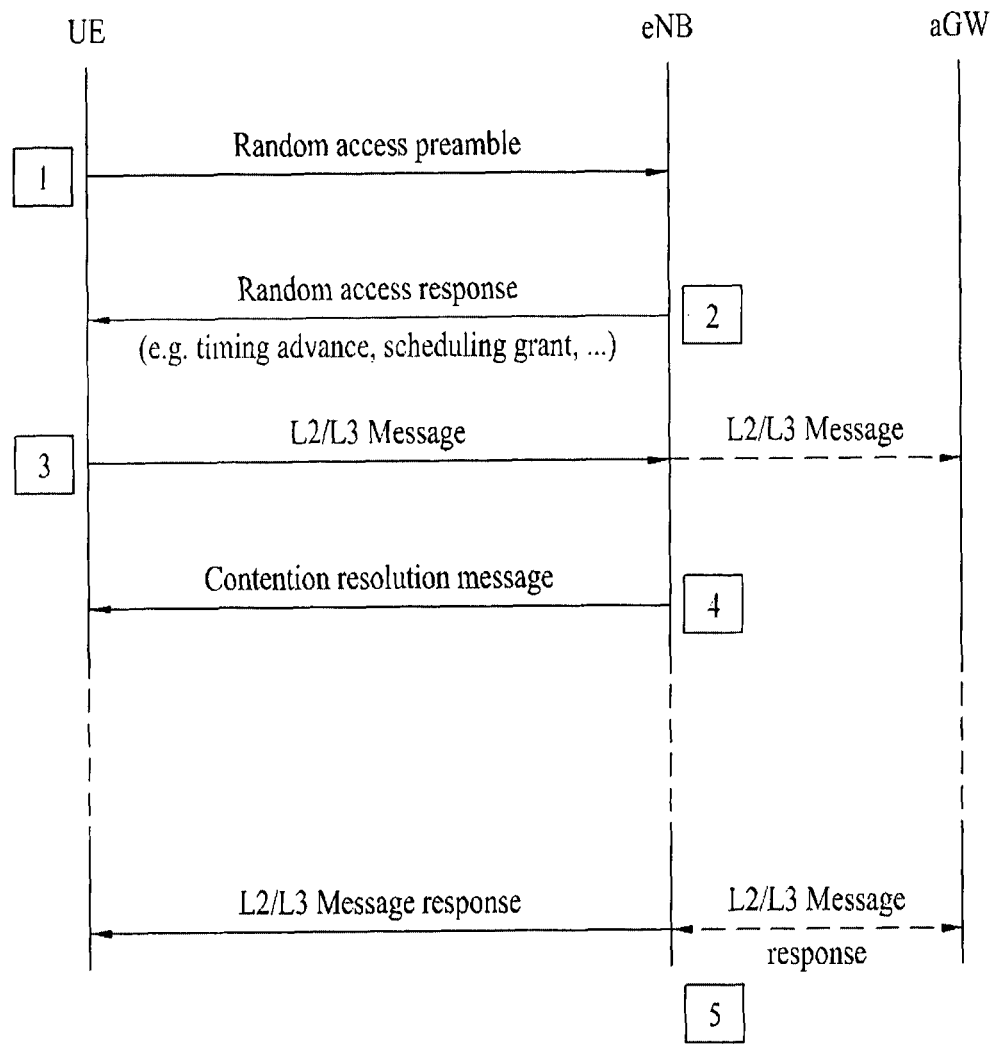
FIG. 6 illustrates a contention-based Random Access (RA) procedure.

FIG. 6 illustrates a contention-based random access procedure. The random access procedure is also referred to as a Random Access Channel (RACH) procedure. The RACH procedure can be used for several purposes. For example the RACH procedure can be used to access the network, to request resources, to carry control information, to adjust the time offset of the uplink in order to obtain uplink synchronization, to adjust transmission power, etc.

With reference to FIG. 6, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response, adapts UL transmission timing and adapts UL transmission power if the random access response contains power control information. The UE then sends a resource request message (message 3, box 3) via an uplink shared channel. In the message 3, the UE requests bandwidth and time resources to transmit data and it also indicates an UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with an UE-specific signature, the eNB checks how many UEs were detected with the same signature and resolves any possible contentions. If the preamble sent by an UE was in collision with a preamble from another UE, the eNB sends a contention resolution message (message 4, box 4) to command a corresponding UE to re-start the RACH procedure. If the UE was not in collision, the eNB sends a resource assignment message (message 5, box 5). Subsequent transmissions are carried out as usual.

Figure 7:
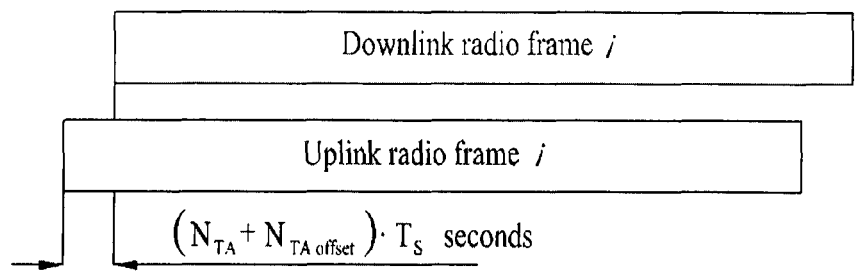
FIG. 7 illustrates an example of uplink-downlink timing relation.

FIG. 7 illustrates an example of uplink-downlink timing relation.

With reference to FIG. 7, transmission of the uplink radio frame number i from an UE may start $(N_{TA}+N_{TAoffset}) \times Ts$ seconds before the start of the corresponding downlink radio frame at the UE, where $0 \leq N_{TA} \leq 20512$, $N_{TAoffset}=0$ for FDD frame structure and $N_{TAoffset}$ 624 for TDD frame structure. When $N_{TA}$ is indicated by a timing advance command, the UE may adjust a transmission timing of UL signals (e.g., PUCCH, PUSCH, SRS, etc.) by using $(N_{TA}+N_{TAoffset}) \times Ts$. UL transmission timing may be adjusted in units of a multiple of 16Ts. Ts represents a sampling time. A timing advance command (TA) in a random access response is 11 bits and indicates a value of 0, 1, 2, ..., 1282, and $N_{TA}$ is given as $N_{TA}=TA*16$. Otherwise, a timing advance command (TA) is 6 bits and indicates a value of 0, 1, 2, ..., 63, and $N_{TA}$ is given as $N_{TA,old}+(TA-31)*16$. The timing advance command received in subframe n is applied starting from subframe n+6.

Figure 8:
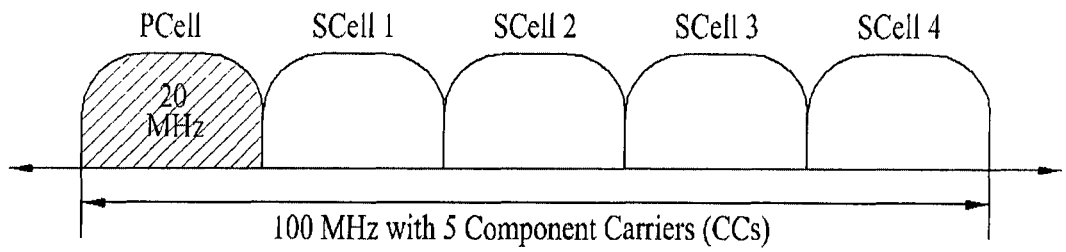
FIG. 8 illustrates an example of Carrier Aggregation (CA).

FIG. 8 illustrates an example of Carrier Aggregation (CA).

With reference to FIG. 8, in order to support wider transmission bandwidths, two or more carriers can be aggregated. Each of the aggregated carriers is referred to as a Component Carrier (CC). In term of CC view, LTE system may be understood as a system of one CC. An UE may simultaneously receive or transmit on one or multiple CCs depending on its capabilities. For example, LTE-A UE with capabilities for CA can simultaneously receive and/or transmit on multiple CCs corresponding to multiple cells. Meanwhile, a LTE UE can receive on a single CC and transmit on a single CC corresponding to one cell only. Here, a cell is a combination of downlink and optionally uplink resources. The CA is supported for both contiguous and non-contiguous CCs, in which each CC may be limited to a maximum of 20 MHz. When the CA is configured, the UE only has one RRC connection with the network. At RRC connection establishment/re-establishment/handover, one cell provides the NAS mobility information (e.g. Tracking Area Identity, TAI), and at RRC connection re-establishment/handover, one cell provides the security input. This cell may be referred to as a Primary Cell (PCell). In the downlink, the carrier corresponding to the PCell is the Downlink Primary Component Carrier (DL PCC) while in the uplink it is the Uplink Primary Component Carrier (UL PCC). Cell(s) other than PCell may be referred to as a Secondary Cell (SCell). Depending on UE capabilities, SCells can be configured to form together with the PCell a set of serving cells. In the downlink, the carrier corresponding to a SCell is a Downlink Secondary Component Carrier (DL SCC) while in the uplink it is an Uplink Secondary Component Carrier (UL SCC).

Figure 9:
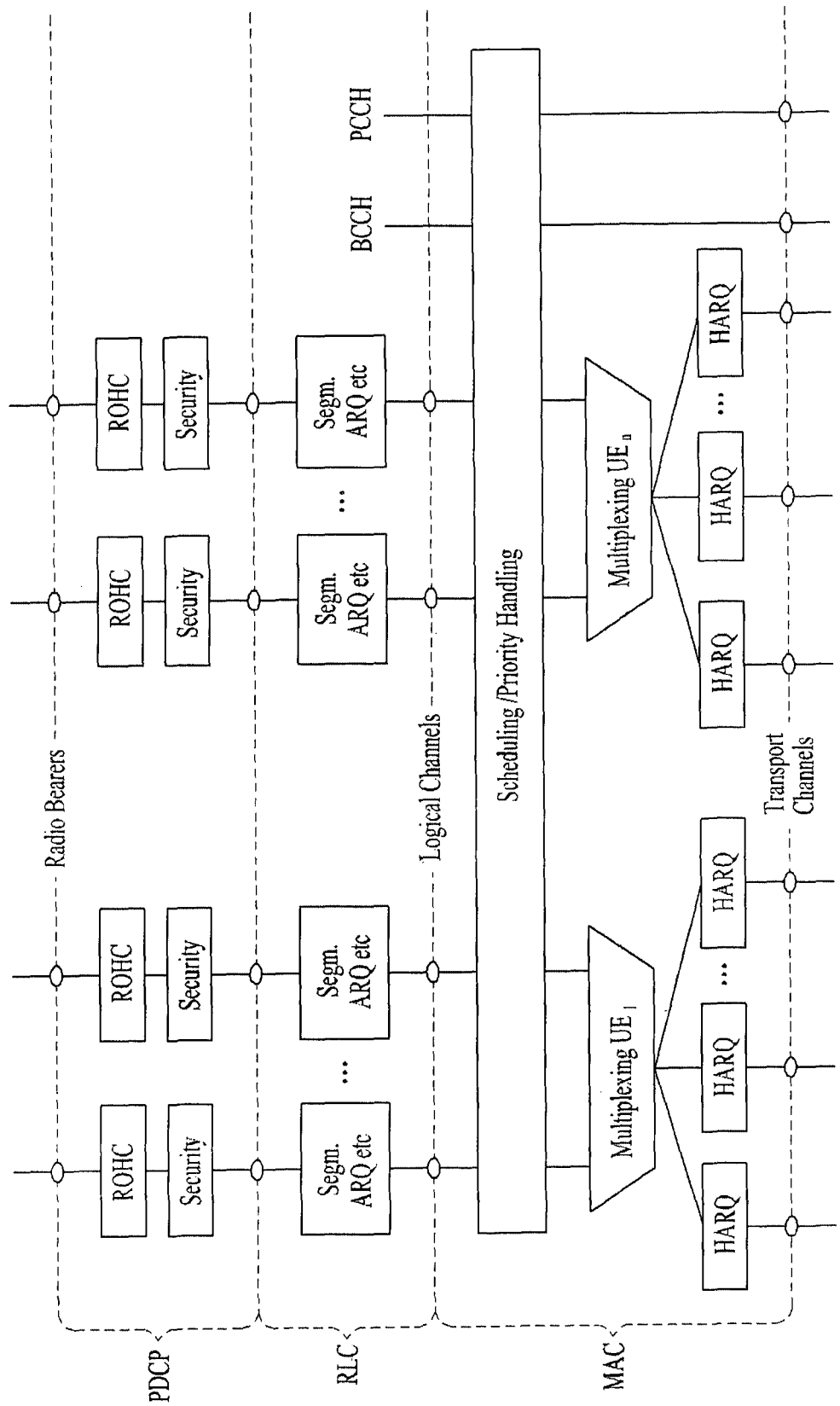
FIGS. 9~10 illustrate structures of protocol layer 2 for CA.
Figure 10:
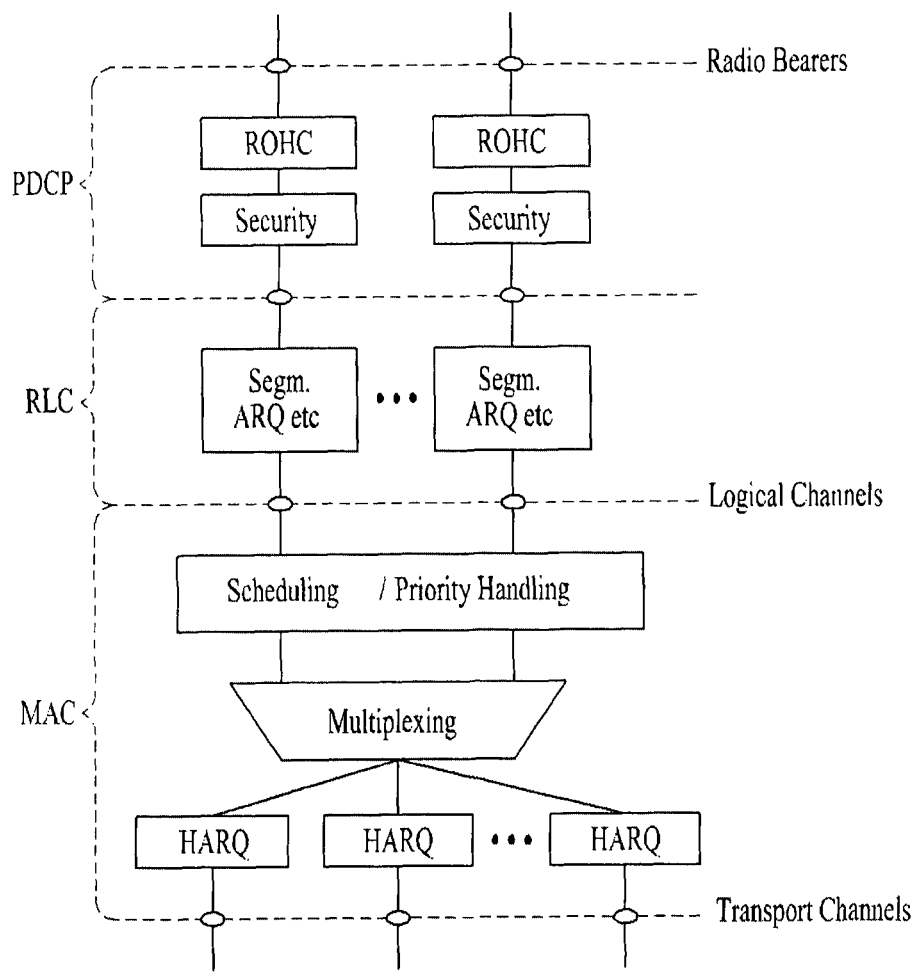

FIG. 9 illustrates a downlink structure of protocol layer 2 for CA. FIG. 10 illustrates an uplink structure of protocol layer 2 for CA. A CA scheme has many influences to the MAC layer in layer 2. For example, in the CA, plural CCs are used and one HARQ entity manages one CC, thus the MAC layer should be able to perform operations related with plural HARQ entities. In addition, each HARQ entity independently processes a Transport Block (TB), thus plural transport blocks may be transmitted and/or received in a same time.

In the CA, a network (particularly, BS) may add and release SCell(s) for an UE in accordance with the UE's traffic situation. In addition, in order to reduce overhead due to the addition and release of SCell(s), instead of newly configuring (e.g., adding and releasing) SCell(s) when it is needed, the network may activate and deactivate configured SCell(s), while PCell is always activated. Activation/deactivation of a SCell is explained below in detail.

If a SCell is deactivated: the UE
not transmit SRS on the SCell;
not report Channel Quality Indicator (CQI)/Precoding Matrix Index (PMI)/Rank Indicator (RI)/Precoding Type Indicator (PTI) for the SCell;
not transmit on UL-SCH on the SCell;
not monitor the PDCCH on the SCell;
not monitor the PDCCH for the SCell.

The network activates/deactivates the SCell(s) by sending an Activation/Deactivation MAC Control Element (MAC CE).

Figure 11:
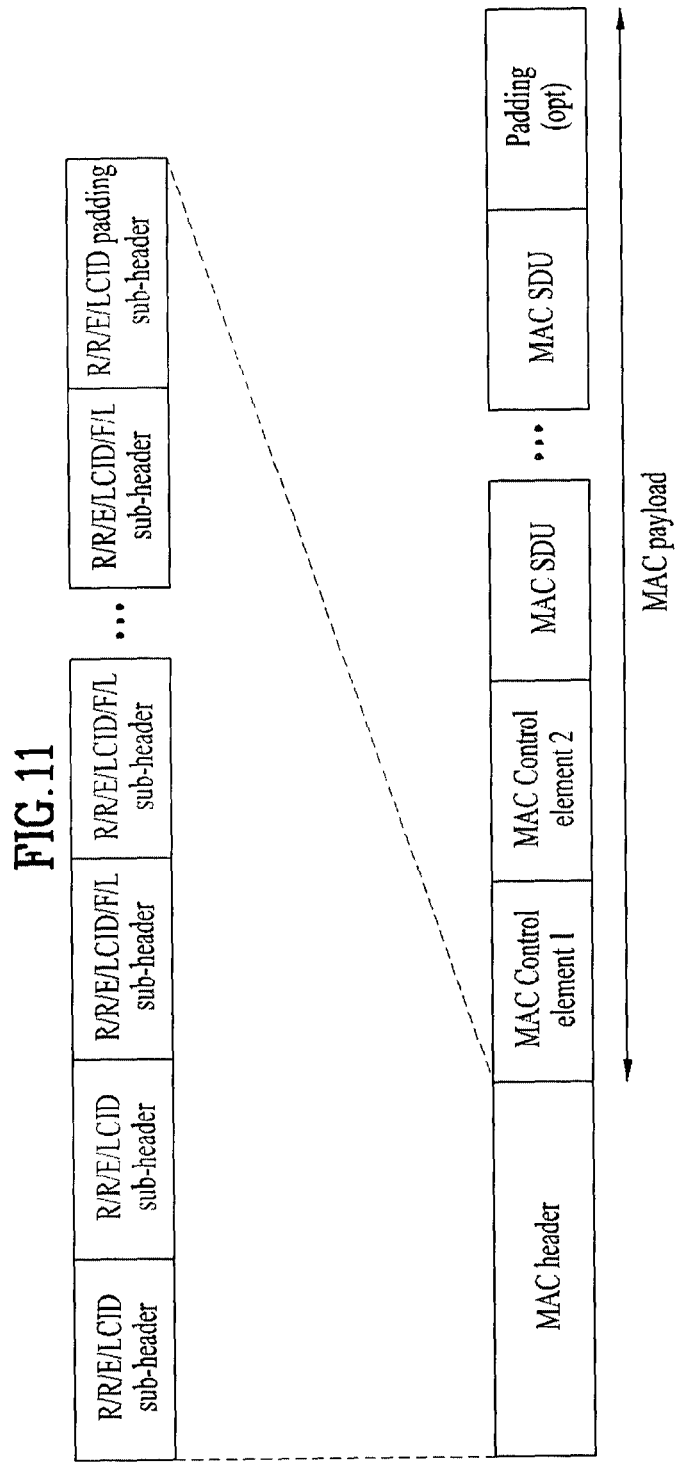
FIG. 11 illustrates a MAC PDU structure.

FIG. 11 illustrates a MAC PDU structure. A MAC PDU is transmitted via a Downlink Shared Channel (DL-SCH) and an Uplink Shared Channel (UL-SCH). A MAC PDU consists of a MAC header, zero or more MAC Service Data Units (MAC SDUs), zero, or more MAC Control Elements (MAC CEs), and optionally padding. MAC PDU subheaders have the same order as the corresponding MAC SDUs, MAC control elements and padding. MAC control elements are always placed before any MAC SDU.

Figure 12:
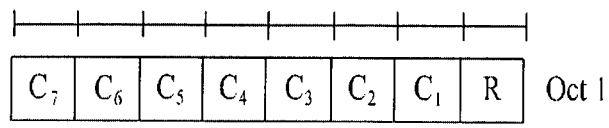
FIG. 12 illustrates an activation/deactivation MAC CE.

FIG. 12 illustrates an activation/deactivation MAC CE. The activation/deactivation MAC CE is identified by a MAC PDU subheader with Logical Channel Identifier (LCID) (e.g., LCID=11011) indicating activation/deactivation. The activation/deactivation MAC CE consists of a single octet containing seven C-fields and one R-field.

$C_i$: if there is an SCell configured with SCellIndex i, this field indicates the activation/deactivation status of the SCell with SCellIndex i, else the UE shall ignore the $C_i$ field. The $C_i$ field is set to "1" to indicate that the SCell with SCellIndex i shall be activated. The $C_i$ field is set to "0" to indicate that the SCell with SCellIndex i shall be deactivated; and R: Reserved bit, set to "0".

Meanwhile, when the network transmits an activation/deactivation command in order to deactivate SCell(s), the UE may miss the activation/deactivation command due to any reason such as radio conditions. In order to address this problem, the UE assumes that a SCell is in a deactivation state when the SCell has not been used for a certain time, instead of not maintaining activation state of a SCell. As an example, the UE may operate a secondary serving cell deactivation timer (e.g., sCellDeactivationTimer) per each configured SCell and deactivate an associated SCell upon its expiry. The timer value is configured per an UE; i.e., the same timer value applies for each SCell. The timer value may be indicated as a value in number of radio frames, e.g., {2 ms, 4 ms, 8 ms, 16 ms, 32 ms, 64 ms, 128 ms}. The timer value may be signaled by using a RRC message, in particular MAC configuration information for signaling and data radio bearers in the RRC message.

Configured SCell(s) is initially deactivated upon addition and after a handover.

The UE may for each Transmission Time Interval (TTI) and for each configured SCell:
if the UE receives an Activation/Deactivation MAC CE in this TTI activating the SCell, the UE may in the TTI:
activate the SCell; i.e. apply normal SCell operation including:
SRS transmissions on the SCell;
CQI/PMI/RI/PTI reporting for the SCell;
PDCCH monitoring on the SCell;
PDCCH monitoring for the SCell
start or restart the sCellDeactivationTimer associated with the SCell;
else, if the UE receives an Activation/Deactivation MAC CE in this TTI deactivating the SCell; or
if the sCellDeactivationTimer associated with the activated SCell expires in this TTI:
deactivate the SCell;
stop the sCellDeactivationTimer associated with the SCell;
flush all HARQ buffers associated with the SCell.
if PDCCH on the activated SCell indicates an uplink grant or downlink assignment; or
if PDCCH on the Serving Cell scheduling the activated SCell indicates an uplink grant or a downlink assignment for the activated SCell:
restart the sCellDeactivationTimer associated with the SCell;
if the SCell is deactivated:
not transmit SRS on the SCell;
not report CQI/PMI/RI/PTI for the SCell;
not transmit on UL-SCH on the SCell;
not monitor the PDCCH on the SCell;
not monitor the PDCCH for the SCell.

Figure 13:
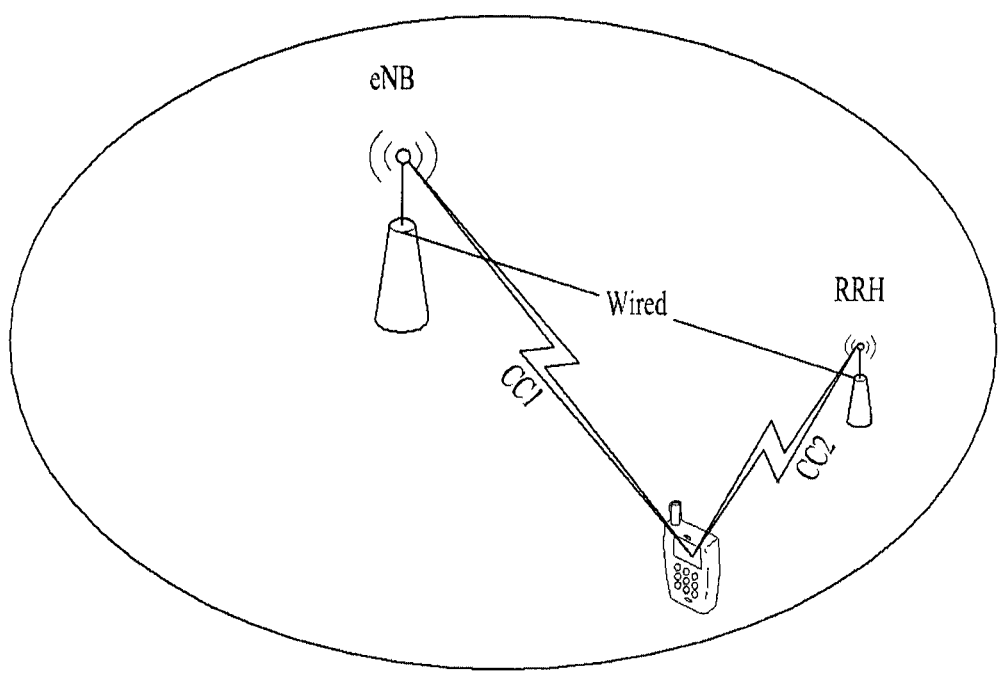
FIG. 13 illustrates an example that plural CCs with different frequency characteristics are aggregated.

FIG. 13 illustrates an example that plural CCs with different frequency characteristics are aggregated.

With reference to FIG. 13, an UE aggregates 2 CCs, one (CC1) of which communicates signals using an Remote Radio Header (RRH) (e.g., repeater) due to limited coverage, and the other one (CC2) of which directly communicates with a base station without the RRH. Thus, a propagation delay (or a reception timing at the base station) of UL signals, which are transmitted via CC1 from an UE, may be different from a propagation delay (or a reception timing at the base station) of UL signals, which are transmitted via CC2 from the UE. In this case, if plural serving cells try to transmit uplink signals without synchronizing transmission timing, interferences between cells may occur. Thus a plurality of time alignment managements may be needed.

Meanwhile, when the UE uses a plurality of serving cells, there may be serving cells showing similar timing synchronization characteristics. For example, serving cells in the same band may show similar timing synchronization characteristics. Thus, in the CA, in order to optimize a signal overhead due to adjusting a plurality of uplink timing synchronizations, serving cells showing similar timing synchronization characteristics may be managed as a group, which is called as a Timing Advance Group (TAG). To this end, at least one of serving cell(s) in a TAG should have an uplink resource, and serving cell(s) showing similar timing synchronization characteristics may belong to the TAG. For each serving cell, a base station may inform an UE of TAG assignment by using a TAG identifier in an RRC signal. The TAG identifier may be a value from 1 to a maximum number of TAGs that can be configured for an UE. An UE may be assigned two or more TAGs. If a TAG identifier indicates 0, it may mean a TAG including a PCell. For convenience, a TAG including the PCell is referred to a Primary TAG (pTAG), and another TAG(s) is referred to a Secondary TAG (secTAG). A secondary TAG identifier (secTAG-ID) may be used to indicate a corresponding secTAG of an SCell. If secTAG-ID is not configured for an SCell, the SCell may be configured a part of the pTAG.

Example

Cell Activation Controlling in CA

In conventional arts, in order to control activity of secondary serving cell(s) (SCell(s)), if a secondary serving cell has no data activity (e.g., no transmission/reception) for a predetermined time, the secondary serving cell is deactivated. To this end, each secondary serving cell independently operates its secondary serving cell deactivation timer (sCellDeactivationTimers), but the same timer value applies for each secondary serving cell (i.e., per-UE secondary serving cell deactivation timer value). Thus, in an UE, all secondary serving cell deactivation timer(s) are set to the same timer value.

In particular, a base station may configure a value of the secondary serving cell deactivation timer in consideration of usage pattern of secondary serving cell(s), for example, data activity (transmission/reception frequency and amount of data). For example, when the data activity of a secondary serving cell is low, a small value is configured for the secondary serving cell deactivation timer. However, in this case, the small value of the secondary serving cell deactivation timer may not be proper for a certain secondary serving cell. For example, for a secondary serving cell on which a random access process is being performed, if the small value of the secondary serving cell deactivation timer is configured, the secondary serving cell deactivation timer may expire before the random access procedure is completed on the secondary serving cell, and thus the secondary serving cell may be deactivated unintentionally.

In order to address the above problems, the present invention proposes to independently configure/set a secondary serving cell deactivation timer value per a TAG (hereinafter, per-TAG secondary serving cell deactivation timer value). In particular, a base station may determine a secondary serving cell deactivation timer value per a TAG, and may transmit information related with the timer value to an UE. Using the information related with the timer value, the UE may configure a secondary serving cell deactivation timer value per a TAG. The secondary serving cell deactivation timer value is applied to all secondary serving cell(s) in a corresponding TAG only.

The per-TAG secondary serving cell deactivation timer value may be determined at the base station by considering, for example, geometrical condition, physical condition and usage pattern of each secondary serving cell. Information indicating per-TAG secondary serving cell deactivation timer value(s) may be transmitted from the base station to the UE by using an RRC signal or a MAC signal. Information indicating per-TAG secondary serving cell deactivation timer value(s) may be transmitted along with information identifying a corresponding TAG. For example, information indicating the per-TAG secondary serving cell deactivation timer value may have following formats.

<TAG identifier, Secondary serving cell deactivation timer value>

<Secondary serving cell identifier (e.g., SCellIndex), secondary serving cell deactivation timer value>

The signal may include a set of per-TAG secondary serving cell deactivation timer values (e.g., a set of <TAG identifier, Secondary serving cell deactivation timer value>s, a set of <Secondary serving cell identifier, Secondary serving cell deactivation timer value>s).

In the above formats, information identifying a TAG may be signaled implicitly based on via which TAG or secondary serving cell the signal is received.

Information indicating per-TAG secondary serving cell deactivation timer value(s) may be transmitted from the base station to the UE when one or more secondary serving cells are added/modified/released. In this case, the information indicating per-TAG secondary serving cell deactivation timer value(s) may be transmitted via an RRC connection (re)configuration message. Meanwhile, even though one or more secondary serving cells are not added/modified/released, if the base station determines that it is needed to modify a secondary serving cell deactivation timer value, information indicating per-TAG secondary serving cell deactivation timer value(s) may be transmitted from the base station to the UE.

When information indicating per-TAG secondary serving cell deactivation timer value is received, the UE may perform following operations:

When <TAG identifier, Secondary serving cell deactivation timer value> is received, the UE may apply the secondary serving cell deactivation timer value to all secondary serving cell(s) in a TAG indicated by the TAG identifier.

When <Secondary serving cell identifier (e.g., SCellIndex), Secondary serving cell deactivation timer value> is received, the UE may apply the secondary serving cell deactivation timer value to all secondary serving cell(s) in a TAG to which a secondary serving cell indicated by the secondary serving cell belongs.

Figure 14:
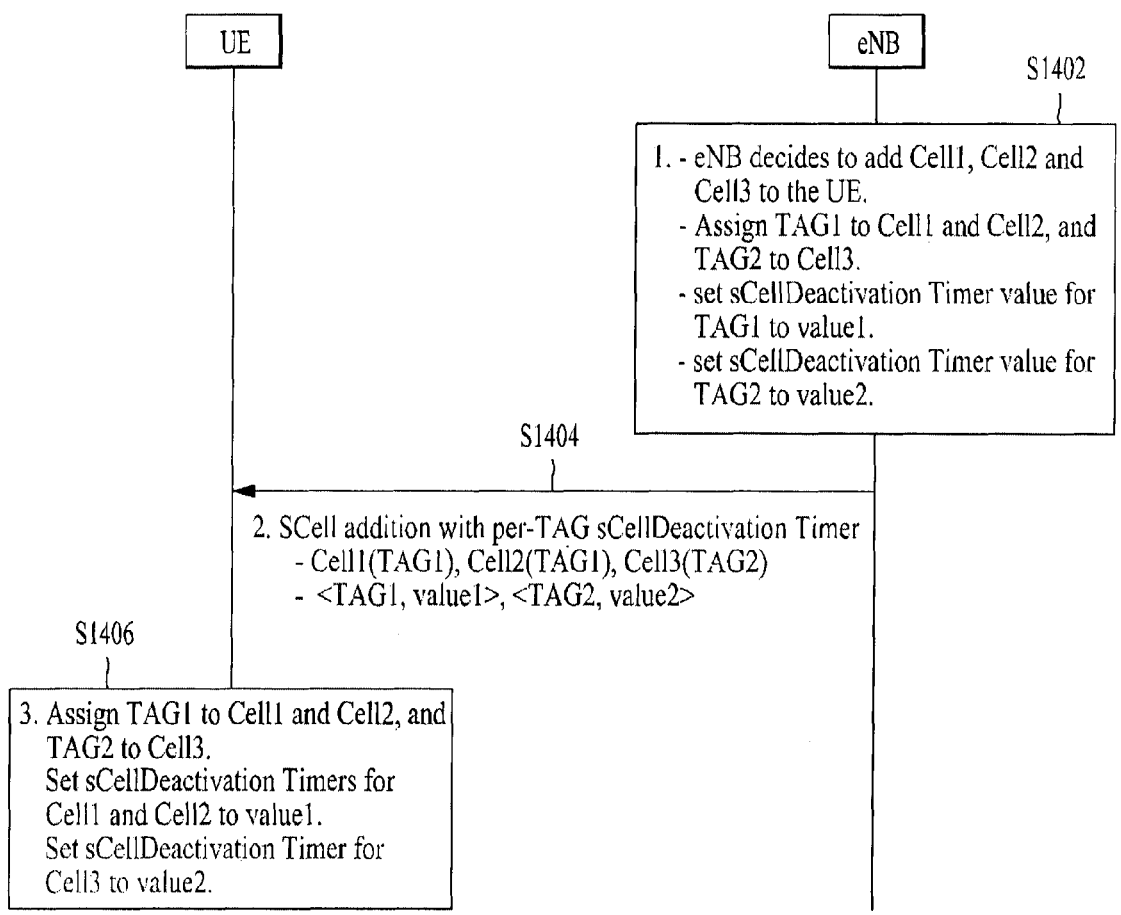
FIGS. 14~16 illustrate examples of configuring secondary serving cell deactivation timer value(s) in accordance with the present invention.

FIG. 14 illustrates an example of configuring secondary serving cell deactivation timer value(s) in accordance with the present invention. FIG. 14 shows a case that secondary serving cell deactivation timer value(s) is signaled when one or more secondary serving cells are added.

With reference to FIG. 14, a base station (eNB) may decide to add Cell1, Cell2 and Cell3 to an UE (S1402), in which TAG1 may be assigned to Cell and Cell2, and TAG2 may be assigned to Cell3. In this case, with regard to all secondary serving cells in TAG1, a secondary serving cell deactivation timer value (sCellDecativationTimer value) may be set to a value1. And, with regard to all secondary serving cells in TAG2, a secondary serving cell deactivation timer value may be set to a value2. That is, the value1 is a per-TAG sCellDecativationTimer value for TAG1, and the value2 is a per-TAG sCellDecativationTimer value for TAG2.

Then, the base station may transmit information related with TAG assignment(s) and information related with the per-TAG sCellDecativationTimer value(s) via a signal for adding Cell1, Cell2 and Cell3 to the UE (S1404). For example, the signal may be a RRC connection (re)configuration message including cell addition information. Alternatively, information related with TAG assignment(s) and information related with the per-TAG sCellDecativationTimer value(s) may be transmitted separately from the signal for adding Cell1, Cell2 and Cell3. The information related with TAG assignment(s) may allocate a TAG to an added cell: e.g., Cell (TAG1), Cell2 (TAG1) and Cell3 (TAG2). TAG assignment may be performing by assigning a TAG identifier to a cell. The information related with the per-TAG sCellDecativationTimer value(s) may have following format: <TAG identifier, Secondary serving cell deactivation timer value> (e.g., <TAG-ID of TAG1, value1>, <TAG-ID of TAG2, value2>). Alternatively, the information related with the per-TAG sCellDecativationTimer value(s) may include per-TAG secondary serving cell deactivation timer value(s) without a corresponding TAG identifier. In this case, per-TAG sCellDecativationTimer values are placed in an increasing (or decreasing) order of assigned TAG identifiers.

Upon receiving the signal of the step S1404, the UE may perform RRC reconfiguration to add Cell1, Cell2 and Cell3 (S1406), in which TAG1 is assigned to Cell1 and Cell2 and TAG2 is assigned to Cell3. The UE may set a secondary serving cell deactivation timer of all secondary serving cells in TAG1 (i.e., Cell1 and Cell2) to the value1, and may set a secondary serving cell deactivation timer of all secondary serving cells in TAG2 (i.e., Cell3) to the value2.

The present example may be also applied to a pTAG. For example, if a TAG-ID indicates pTAG, a corresponding sCell- DecativationTimer value may be applied to all serving cell(s), except the PCell, in the pTAG. Alternatively, per-TAG sCellDecativationTimer value may have a restriction not be applied to the pTAG. In this case, if the TAG-ID indicates the pTAG, the corresponding sCellDecativationTimer value may be assumed as an error and thus disregarded. And, a conventional per-UE sCellDecativationTimer value can be applied for all secondary serving cell(s) in the pTAG.

Figure 15:
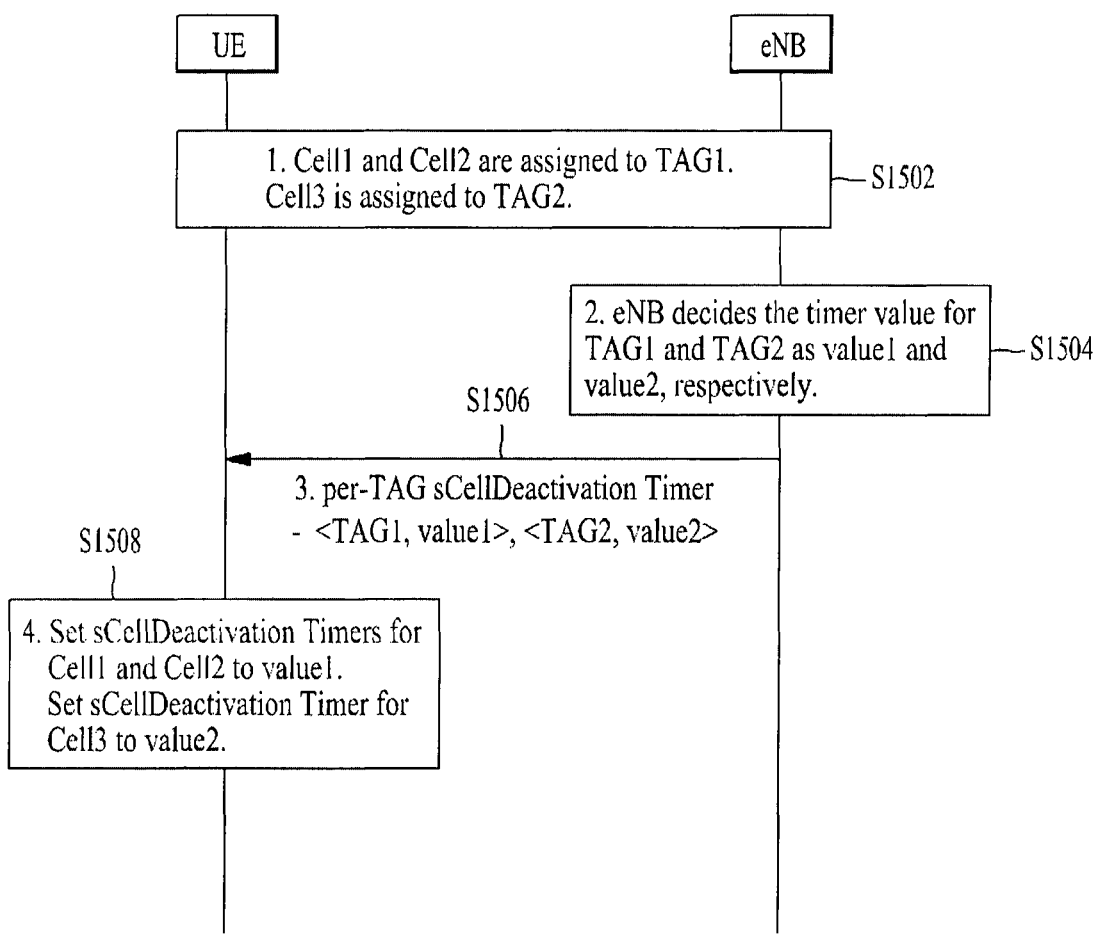

FIG. 15 illustrates another example of configuring secondary serving cell deactivation timer value(s) in accordance with the present invention. FIG. 15 shows a case that per-TAG secondary serving cell deactivation timer value(s) is modified by using a signal indicating TAG identifier and secondary serving cell deactivation timer value(s).

With reference to FIG. 15, an UE is configured with three serving cells (Cell1, Cell2 and Cell3) (S1502). It is assumed that TAG1 is assigned to Cell1 and Cell2, and TAG2 is assigned to Cell3. In this case, with regard to all secondary serving cells in TAG1, a base station may determine to set a secondary serving cell deactivation timer value (sCellDecativationTimer value) to a value1 (S1504). And, with regard to all secondary serving cells in TAG2, the base station may determine to set a secondary serving cell deactivation timer value to a value2. That is, the value1 is a per-TAG sCellDecativationTimer value for TAG1, and the value2 is a per-TAG sCellDecativationTimer value for TAG2.

Then, the base station may transmit a signal including information indicating per-TAG sCellDecativationTimer value(s) (S1506). For example, the information indicating per-TAG sCellDecativationTimer value(s) may have a following format: <TAG identifier, sCellDecativationTimer value> (e.g., <TAG-ID of TAG1, value1>, <TAG-ID of TAG2, value2>). Alternatively, the information indicating per-TAG sCellDecativationTimer value(s) may include per-TAG secondary serving cell deactivation timer value(s) without corresponding TAG identifier(s). In this case, per-TAG sCellDecativationTimer values are placed in an increasing (or decreasing) order of assigned TAG identifiers.

Upon receiving the signal of the step S1506, the UE may set a secondary serving cell deactivation timer of all secondary serving cells in TAG1 (i.e., Cell1 and Cell2) to the value1, and may set a secondary serving cell deactivation timer of all secondary serving cells in TAG2 (i.e., Cell3) to the value2 (S1508).

The present example may be also applied to a pTAG. For example, if a TAG-ID indicates pTAG, a corresponding sCellDecativationTimer value may be applied to all serving cell(s), except the PCell, in the pTAG. Alternatively, per-TAG sCellDecativationTimer value may have a restriction not be applied to the pTAG. In this case, if the TAG-ID indicates the pTAG, the corresponding sCellDecativationTimer value may be assumed as an error and thus disregarded. And, a conventional per-UE sCellDecativationTimer value can be applied for all secondary serving cell(s) in the pTAG.

Figure 16:
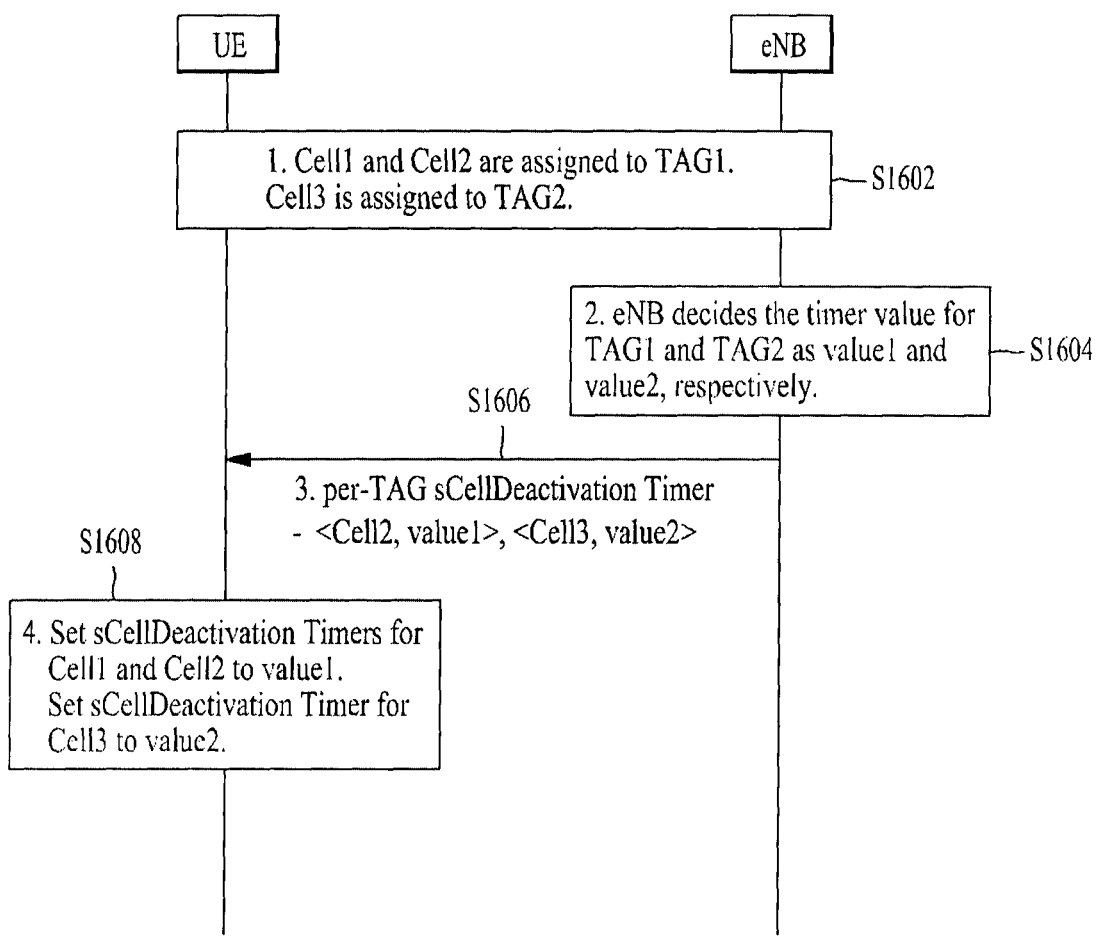

FIG. 16 illustrates an example of configuring secondary serving cell deactivation timer value(s) in accordance with the present invention. FIG. 16 shows a case that secondary serving cell deactivation timer value(s) is configured by using a signal including a serving cell identifier and a secondary serving cell deactivation timer value.

With reference to FIG. 16, an UE is configured with three serving cells (Cell1, Cell2 and Cell3) (S1602). It is assumed that TAG1 is assigned to Cell1 and Cell2, and TAG2 is assigned to Cell3. In this case, with regard to all secondary serving cells in TAG1, a base station may determine to set a secondary serving cell deactivation timer value (sCellDecativationTimer value) to a value1 (S1604). And, with regard to all secondary serving cells in TAG2, the base station may determine to set a secondary serving cell deactivation timer value to a value2. That is, the value1 is a per-TAG sCellDecativationTimer value for TAG1, and the value2 is a per-TAG sCellDecativationTimer value for TAG2.

Then, the base station may transmit a signal including information indicating the per-TAG sCellDecativationTimer value(s) (S1606). For example, the information indicating the per-TAG sCellDecativationTimer value(s) may have following format: <(Secondary) Serving cell identifier, sCellDecativationTimer value> (e.g., <SCellIndex of Cell2, value1>, <SCellIndex of Cell3, value2>). Upon receiving the signal of the step S1606, the UE may set a secondary serving cell deactivation timer of all secondary serving cells (i.e., Cell1 and Cell2) in TAG1, to which Cell2 belongs, to the value1, and may set a secondary serving cell deactivation timer of all secondary serving cells, to which Cell3 belongs, in TAG2 (i.e., Cell3) to the value2 (S1608).

The present example may be also applied to a pTAG. For example, if a serving cell identifier indicates a PCell, a corresponding sCellDecativationTimer value may be applied to all serving cell(s), except the PCell, in the pTAG. Alternatively, per-TAG sCellDecativationTimer value may have a restriction not be applied to the pTAG. In this case, if the serving cell identifier indicates the PCell, the corresponding sCellDecativationTimer value may be assumed as an error and thus disregarded. And, a conventional per-UE sCellDecativationTimer value can be applied for all secondary serving cell(s) in the pTAG.

In accordance with the examples of the present invention, an UE is able to apply a secondary serving cell deactivation timer value to all secondary serving cells only in a TAG of all assigned TAGs, whereby it is possible to a proper secondary serving cell deactivation timer value to a corresponding secondary serving cell(s) in CA-based communication system.

Figure 17:
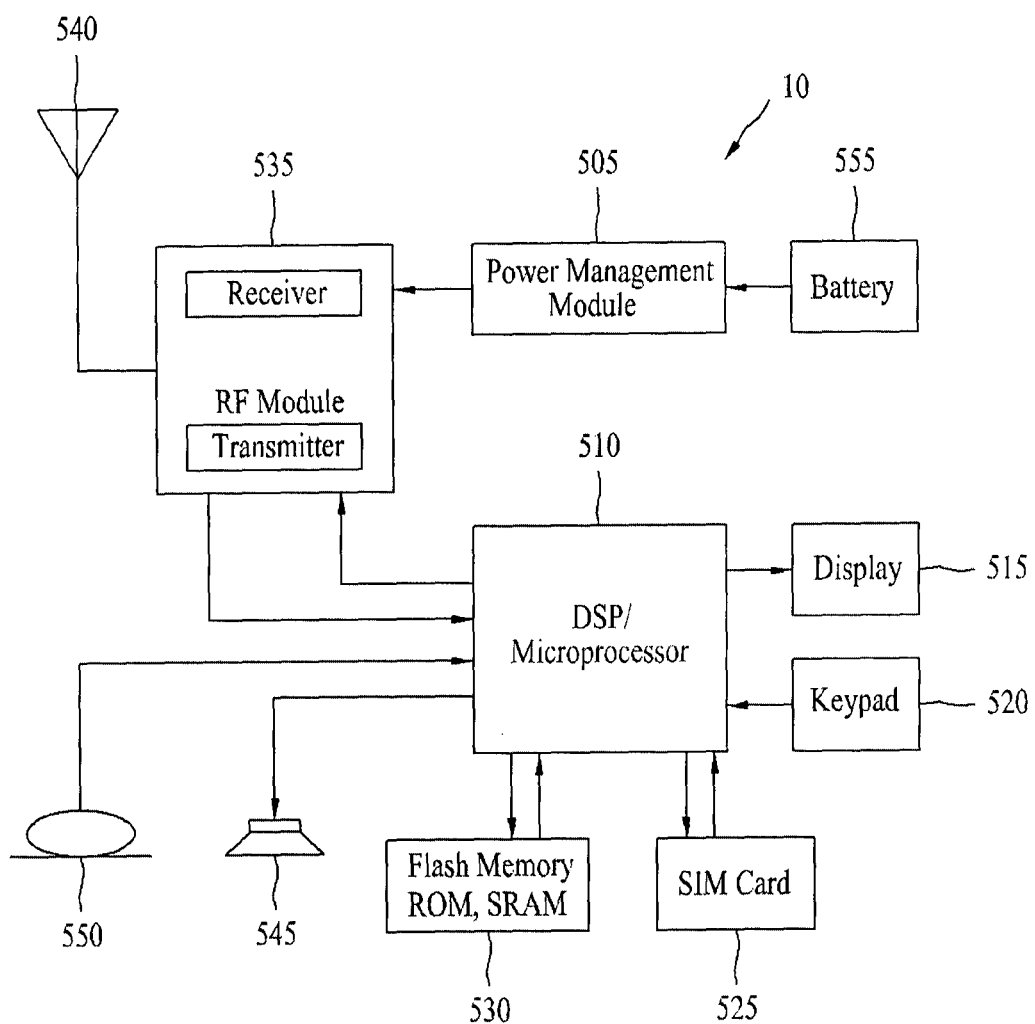
FIG. 17 illustrates a block diagram of a User Equipment (UE) or Mobile Station (MS).

FIG. 17 illustrates a block diagram of an UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and an UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatus used for in a wireless communication system. The apparatus may include a user equipment, a base station, a relay, a repeater, and the like.

The invention claimed is:

1. A method of controlling cell activity at a user equipment in a wireless communication system, the method comprising:
receiving first and second identifiers, and first and second cell deactivation timer values corresponding to the first and second identifiers, respectively,
wherein the first identifier identifies a first Timing Advance Group (TAG) and the second identifier identifies a second TAG,
wherein the first and second cell deactivation timer values are used for cell deactivation of the first and second TAGs, respectively, and
wherein the first cell deactivation timer value is different from the second cell deactivation timer value;
applying the first cell deactivation timer value to every cell belonging to the first TAG; and
applying the second cell deactivation timer value to every cell belonging to the second TAG.

2. The method of claim 1, wherein the first identifier is a cell identifier, and the first cell deactivation timer value is applied to the every cell belonging to the first TAG including a cell indicated by the cell identifier.

3. The method of claim 2, wherein the cell identifier is a secondary cell identifier.

4. The method of claim 1, wherein the first and second identifiers, and the first and second cell deactivation timer values corresponding to the first and second identifiers, are received using a Radio Resource Control (RRC) signal or a Medium Access Control (MAC) signal.

5. The method of claim 1, wherein the first cell deactivation timer value is configured based on data activity of the every cell belonging to the first TAG, and
wherein the second cell deactivation timer value is configured based on data activity of the every cell belonging to the second TAG.

6. A User Equipment (UE) configured to control cell activity in a wireless communication system, the UE comprising:
a radio frequency (RF) module; and
a processor operably coupled to the RF module, wherein the processor is configured to:
receive first and second identifiers, and first and second cell deactivation timer values corresponding to the first and second identifiers, respectively,
wherein the first identifier identifies a first Timing Advance Group (TAG) and the second identifier identifies a second TAG,
wherein the first and second cell deactivation timer values are used for cell deactivation of the first and second TAGs, respectively, and
wherein the first cell deactivation timer value is different from the second cell deactivation timer value,
apply the first cell deactivation timer value to every cell belonging to the first TAG, and
apply the second cell deactivation timer value to every cell belonging to the second TAG.

7. The UE of claim 6, wherein the first identifier is a cell identifier, and the first cell deactivation timer value is applied to one or more cells belonging to the first TAG including a cell indicated by the cell identifier.

8. The UE of claim 7, wherein the cell identifier is a secondary cell identifier.

9. The UE of claim 6, wherein the first and second identifiers, and the first and second cell deactivation timer values corresponding to the first and second identifiers, are received using a Radio Resource Control (RRC) signal or a Medium Access Control (MAC) signal.

10. The UE of claim 6, wherein the first cell deactivation timer value is configured based on data activity of the every cell belonging to the first TAG, and
  wherein the second cell deactivation timer value is configured based on data activity of the every cell belonging to the second TAG.

\* \* \* \* \*